Nov. 24, 1936.  C. T. FOSS  2,061,999

ANTIFRICTION BEARING

Filed April 16, 1935

INVENTOR
Clifton T. Foss
BY
Edwards, Bower & Pool
ATTORNEYS

Patented Nov. 24, 1936

2,061,999

UNITED STATES PATENT OFFICE 2,061,999

ANTIFRICTION BEARING

Clifton T. Foss, Stewart Manor, N. Y., assignor to Arma Engineering Co., Inc., Brooklyn, N. Y., a corporation of New York Application April 16, 1935, Serial No. 16,548

1 Claim. (Cl. 308—201)

This invention relates to anti-friction bearings of the ball and roller type, and particularly to those in which separating means is used to space the balls or rollers with relation to each other.

In such bearings small imperfections in the raceways and differences in the size of even the most carefully selected balls or rollers are inevitable. Consequently, as the balls or rollers are carried around by the relative rotation of the raceways one or more of them will so far lag or lead the others as to become jammed against the separating means. The further rotation of the raceways then continues to try to force the ball or roller against the separator, and the resultant necessary slippage and grinding between the parts causes excessive resistance and wear.

The object of this invention is to avoid this jamming and grinding action and to provide a bearing construction which will automatically compensate for irregularities and inaccuracies in the raceways and the balls or rollers.

In the accompanying drawing illustrating the invention

Figure 1:
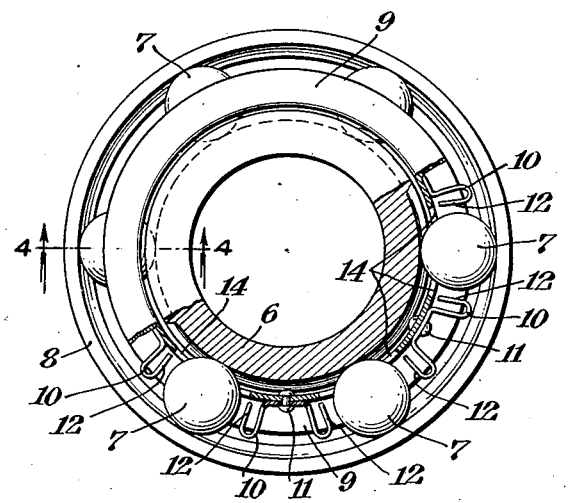
Fig. 1 is a plan view of a ball bearing with parts broken away to show the construction beneath.

A ball bearing of the type shown in Fig. 1 usually comprises an inner ring or raceway 6, balls 7, an outer ring or raceway 8 and a retainer formed as an annular cage carrying rigid portions intervening between the balls to separate them. This retainer rotates with the balls at some speed less than that of one raceway relative to the other. Due to unavoidable imperfections some of the balls will be slightly slower and others faster, and will correspondingly back up or run ahead against the spacers. The resulting contact not only adds its friction to the bearing resistance but also increases the frictional losses between the balls and the raceways, the total increase often being many times the normal resistance. This is always objectionable and is particularly serious with precision bearings for scientific and technical instruments where closely predeterminable and constant bearing resistance is required for accuracy of response. In such cases the variability of resistance resulting from the jamming of the balls against the retainer may be a fatally disturbing factor which cannot be provided against because there is no way of knowing when or to what extent the resistance will be altered.

I have found that in bearings there is a range of movement of a given ball or roller where the load forces are less than in the remainder of the circle, and it is during the heavier loaded period that the jamming resistance reaches its maximum. I have also discovered that if the bearing parts are constructed to resiliently yield to the jamming forces during this period of heavy load the reflex action of the resiliency may be used to restore the parts to normal condition of freedom during the range of reduced load effect.

Figure 3:
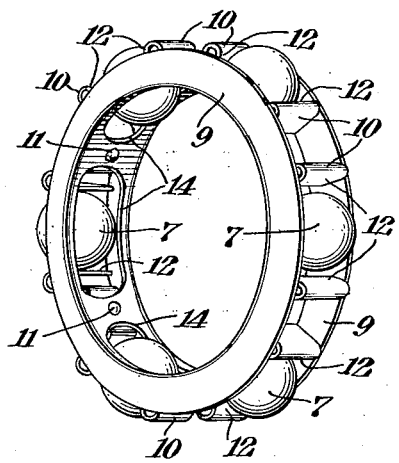
Fig. 3 is a perspective view of the ball cage or retainer.
Figure 2:
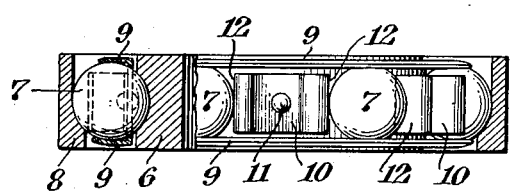
Fig. 2 is a partial horizontal edge view of the bearing shown in Fig. 1 with parts in section.
Figure 4:
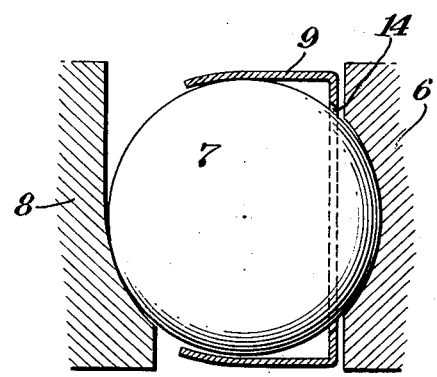
Fig. 4 is a sectional view on enlarged scale taken on line 4—4 of Fig. 1.
Figure 5:
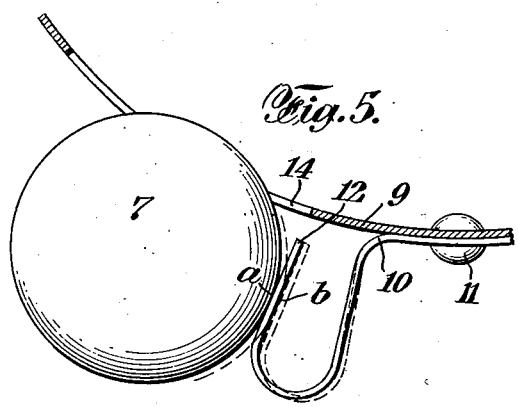
Fig. 5 is a diagrammatic view on enlarged scale illustrating the automatic compensating action of the bearing.

In the bearing of this invention illustrated in Fig. 1, the retainer 9 has its spacing elements formed as springs 10 fastened to the ring 9 at their center portions by rivets 11, and having their ends 12 free to yield when contacted by the balls 7. The slots or windows 14 of the retainer ring are longer than the distance between the spring spacers so that the free ends of these springs overhang the slots as shown in Fig. 3. These free ends are resilient and of carefully predetermined resistance sufficiently low to yield within their elastic limit to all contacting movements of the balls which can take place during the range of relatively heavy loading and without causing relative slippage between the balls and the raceways. The spring ends 12 while thus flexible enough to yield to the creeping of the balls are stiff enough when the range of reduced load is reached to force the ball to slip back substantially the amount of the previous flexure. Assuming an initial contact at $a$ Fig. 5 between the ball 7 and spacer 10 at the entrance to the high load range, then the spring will yield to point $b$ where the space $a$—$b$ represents the continued creeping of the ball for the full extent of this load range. This yielding permits the ball to remain in rolling contact with both raceways without slippage. Then when at $b$ the load is lessened, the reflex of the spring back to point $a$ will return the ball with it to a position of freedom before it again takes up the full bearing load. This automatically confines the slip between the ball and raceway to conditions of relatively light load and avoids altogether the jamming effects hitherto tending to be concentrated and aggravated in the heavy load range. This compensation required by the imperfections of manufacture is, therefore, made at the least objectionable time with a minimum of added friction and with a division of the friction between the heavy load and light load ranges reducing and smoothing out the resistance and making the bearing drag not only less but substantially uniform so that the maximum resistance is greatly decreased.

I claim:

A bearing comprising cooperating raceways, spaced rotary anti-friction elements between them, and spacing means for each of said elements comprising a spacer ring carrying spring members rigidly fastened to said ring and positioned to engage each anti-friction element substantially at its point of nearest approach to the next adjacent element, each of said members having with respect to the point of fastening to said spacer ring a predetermined resiliency in the direction of movement of the engaging element sufficiently low to be flexed by said element with respect to said ring at one period of relative movement of said raceways and sufficiently high to reflex along the line of movement of said element to substantially normal condition at another period of the relative movement of said raceways.

CLIFTON T. FOSS.